United States Patent Office 3,098,712
Patented July 23, 1963

3,098,712
METHOD FOR SELECTIVE REMOVAL OF OXYGEN FROM GASEOUS MIXTURES OF OXYGEN AND NITRIC OXIDE
Holger C. Andersen, Morristown, Philip L. Romeo, Elizabeth, and William J. Green, Newark, N.J., assignors, by mesne assignments, to Engelhard Industries, Inc., Newark, N.J., a corporation of Delaware
No Drawing. Filed Dec. 29, 1959, Ser. No. 862,447
6 Claims. (Cl. 23—159)

This invention relates to the selective removal of nitrogen dioxide and/or oxygen from a gaseous mixture thereof with nitric oxide, and possibly other constituents, whereby the nitric oxide content of the gas stream is increased or not seriously diminished.

The gas compositions which may be treated in accordance with the process of this invention encompass a wide range, from streams which are almost pure nitric oxide to waste or tail gas streams in which the nitrogen oxides and oxygen are present only as impurities.

Nitric oxide substantially free of oxygen or higher oxides of nitrogen is needed commercially for the manufacture of acrylonitrile, by the process disclosed in U.S. Patent No. 2,736,739, for example. Gas streams containing nitric oxide, for example from the catalytic oxidation of ammonia with air, frequently contain unreacted oxygen, and the oxygen will react with a portion of the nitric oxide to form nitrogen dioxide if sufficient reaction time is permitted under temperature conditions favorable for the reaction. While nitrogen dioxide can be separated from the nitric oxide by known methods, this means of removing oxygen from the system is undesirable because each mole of oxygen reacts with two moles of nitric oxide, thus resulting in a substantial loss of yield of the nitric oxide.

The process of the invention consists of the selective removal of nitrogen dioxide and/or oxygen from admixtures thereof with nitric oxide, the term "selectivity" being interpreted in several ways as described below.

In copending application Serial Number 615,496, filed October 12, 1956, there is disclosed a single stage catalytic process for the purification of waste or tail gases wherein oxides of nitrogen are eliminated while heating values of the waste gases are simultaneously recovered. In this process, the oxygen present in the waste gases is removed by a catalytic combustion reaction, and the oxides of nitrogen are reduced to nitrogen and water. In catalytic processes of this type, it has been found that it is generally necessary to have a fuel present in a stoichiometric excess over the oxygen content of the waste gas and, under such conditions, a very large quantity of heat is generated in the catalyst bed.

The high temperature attained by the catalyst is detrimental in that a loss of catalyst activity results, and the problem becomes of greater magnitude with increasing oxygen concentration in the waste or tail gases.

In copending application Serial Number 650,860, filed April 5, 1957, now Patent No. 2,970,034, one method of overcoming the foregoing deficiency is disclosed in which the removal of oxygen and the catalytic reduction of the oxides of nitrogen in waste or tail gases is effected in two stages in such a manner that only a part of the total heat is generated in each stage. The temperature to which the catalyst is subjected is thus decreased and its life and activity are correspondingly extended.

In copending application Serial Number 694,502, filed November 5, 1957, now Patent No. 2,975,025, a process is disclosed for the selective removal of oxides of nitrogen from waste or tail gases without appreciable consumption of the oxygen present in the gases and, in this process, ammonia is used as the fuel. The gaseous mixture is passed over a supported platinum group metal-containing catalyst, whereby selective removal of the oxides of nitrogen from the nitrogen-containing gas is effected.

In order to illustrate the present invention, three industrially important gas streams will be considered:

(1) *Ammonia burner effluent.*—When ammonia is burned catalytically to produce nitrogen oxides, a stream containing nitric oxide, oxygen, nitrogen and water is obtained. A typical composition range, by volume, is:

|  | Percent |
| --- | --- |
| NO | 10–13 |
| $O_2$ | 1–2.5 |
| $H_2O$ | 15–25 |
| $N_2$ | Balance |

(2) *Commercial nitric oxide.*—Commercially available nitric oxide, in high pressure gas cylinders, contains, typically, a fraction of one percent of nitrogen dioxide, the balance being nitric oxide and a small amount of inert gases.

(3) *Nitric acid plant and nitration process tail gases.*—In nitric acid manufacture, ammonia burner effluent is contacted with air and water, converting most of the nitrogen oxides to nitric acid. The waste gas, however, typically contains, by volume, 2 to 4 percent oxygen, 0.2 to 0.4 percent combined nitric oxide and nitrogen dioxide and the balance, nitrogen and water.

When any of these gas streams is mixed with a suitable amount of hydrogen and passed over a platinum group metal catalyst under proper reaction conditions, the nitrogen dioxide or oxygen content is reduced to low levels without destruction of any appreciable quantity of nitric oxide. The chemical reactions are:

(1) $H_2 + NO_2 = NO + H_2O$
(2) $H_2 + \frac{1}{2}O_2 = H_2O$
(3) $H_2 + NO = \frac{1}{2}N_2 + H_2O$ In the case of the ammonia burner effluent, the invention will be further illustrated by considering the stream after the oxygen therein has reacted to form nitrogen dioxide. The gas would then contain, as an example, 8.4 percent, by volume, nitric oxide, 3.8 percent, by volume, nitrogen dioxide, and the balance inert gases. If the nitrogen dioxide is removed by conventional means, such as by scrubbing with water or sulfuric acid, the yield of nitric oxide, with respect to that potentially available, is only $100 \times 8.4/12.2$, or 69 percent. In the present invention, when a gas of this composition is hydrogen-treated over a ruthenium catalyst, followed by scrubbing to remove residual nitrogen dioxide, the nitric oxide content of the effluent gas is 10.2 percent free of oxygen and nitrogen dioxide, and the yield is 84 percent.

When commercial nitric oxide containing 0.4 percent by volume nitrogen dioxide was treated over a platinum catalyst with a $H_2/NO_2$ ratio of 1.2, 79 percent of the nitrogen dioxide was removed, and at least 50 percent of the nitrogen dioxide removed was converted into nitric oxide. With this type of stream, high selectivity is not so important as thorough nitrogen dioxide removal. As shown below, nitrogen dioxide removals to very low levels can be accomplished by the catalytic process, using somewhat higher hydrogen ratios.

With respect to nitric acid plant waste gas, numerous experiments have shown that the nitrogen dioxide content thereof can be reduced from values of the order of 0.2 percent, by volume, to 0.02 percent, by volume, in the presence of hydrogen and a platinum group metal catalyst, without appreciable reduction in the total nitrogen oxides content ($NO + NO_2$). The quantity of hydrogen employed is much less than the total oxygen equivalent of the stream.

Generally speaking, the process of the invention consists of adding hydrogen or other fuel, to a gas stream which contains at least nitric oxide and either nitrogen dioxide or oxygen or both and may also contain inert gases, and passing the mixture over a suitable catalyst.

Among the fuels which may be employed in the process of the invention are hydrogen, carbon monoxide, meth- quantity of fuel may range from less than the nitrogen dioxide equivalent to thirty times the nitrogen dioxide equivalent, depending upon the specific process ob- dioxide equivalent, depending upon the specific process objective. Where a high degree of selectivity is required, the amount of fuel used will usually be equal to or less than the nitrogen dioxide equivalent and, under such circumstances, some nitrogen dioxide will appear in the treated gas, due to the deficiency of the reducing gas, but little or no nitric oxide will be reduced. The residual nitrogen dioxide can be removed by the ordinary conventional means previously described.

As shown in the examples below, there is an overall improvement in nitric oxide yield when nitrogen dioxide is consumed by scrubbing after the catalytic treatment step. Where thorough removal is required, from 2 to 5 times the nitrogen dioxide equivalent of hydrogen usually will be indicated. In such cases, the nitrogen dioxide concentration will be reduced drastically, but appreciable nitric oxide may be consumed.

In general, the first condition, i.e. high selectivity, may be of interest where economical recovery of nitric oxide is being practiced, such as in ammonia burner effluent, and the second condition, i.e. extreme removal of nitrogen dioxide, will be of interest where purification of streams containing relatively small concentrations of nitrogen dioxide is involved.

In some cases, particularly with nitric acid plant waste gas, the process operates in the absence of any catalyst, but catalysts are effective in lowering the required temperature and hydrogen requirement. Using some gas compositions, plain activated alumina, for example, shows some enhancement in reaction rate over that observed in the absence of a catalyst. Of particular interest are the platinum group metals, either per se or supported on suitable carriers, and of these, the preferred catalytic metals are platinum, ruthenium, palladium and rhodium. These metals may be supported on carriers such as activated alumina, silica gel, diatomaceous earth and other similar metal catalyst supports. The catalyst metal may be in the range of 0.05 to about 5 percent by weight of the catalyst metal and support. The support for the catalyst metal may be in the form of pellets, granules or powder. The supported catalyst may be prepared in any suitable manner, e.g. by treating the carrier or support with a solution of a suitable metal compound, and then reducing the metal compound to metal.

The space velocity employed in the process of the present invention may be in the range of 10,000 to 240,000 standard cubic feet of gas per hour per cubic foot of catalyst, or even higher. The general effect of increasing the space velocity is to improve the selectivity of the process.

The temperature range which may be employed in the process of the invention is about 100 to 700° C. or higher. For each catalyst, there is a temperature above and below which nitrogen dioxide removal is poor. Generally, the lowest temperature at which ignition occurs is the most favorable insofar as selectively is concerned. The reaction pressure may be in the range of atmospheric to about 100 p.s.i.g., or higher.

A lower ignition temperature may be employed when hydrogen rather than methane is used as a fuel, i.e. little or no reaction occurs below 350° C. using methane, whereas hydrogen is active at temperatures as low as 100° C.

The equilibrium reaction $2NO + O_2 \rightleftharpoons 2NO_2$ favors $2NO + O_2$ at high temperatures and $2NO_2$ at low temperatures. The practical application of the invention to high temperature purification therefore involves chiefly removal of $O_2$ (for example, at 600° C. no $NO_2$ may be present). At low temperatures, on the other hand, the characteristic reaction of chief interest is the selective removal of $NO_2$.

In ammonia oxidation process streams, an ammonia burner effluent containing about 10 percent of nitric oxide and a lower amount of oxygen is generally supplied by the process at temperatures of about 600° C., so that purified nitric oxide may be made by this process from ammonia burner effluent without the expense of a special heating step before passing the gas over the catalyst. Under these conditions, nitric oxide and oxygen with essentially no nitrogen dioxide are present. Relatively inexpensive natural gas fuel is suitable for ignition with the oxygen present at this temperature and for conversion of the stream to purified nitric oxide.

The gas streams amenable to treatment by the process of the invention may contain nitric oxide, nitrogen dioxide, oxygen and inert gases such as nitrogen, argon, helium and neon. The gases may be dried or saturated with water vapor; the nitrogen dioxide content may be in the range of 0.1 to 5 percent by volume; the nitric oxide, 0.1 to essentially 100 percent by volume; the oxygen from 0 to 22 percent by volume; and the remaining components can be in any concentration to make up the balance.

The invention will be further illustrated by reference to the following specific examples, in which all gases percentages are by volume.

*Example I*

A simulated ammonia burner effluent gas stream was prepared by metering together commercial nitric oxide, air and nitrogen. The air and nitrogen were first passed through a water saturator maintained at an elevated temperature, after which the mixture, under a pressure of 45 p.s.i.g., was passed through a gas-fired preheater coil and then into a 1.05 inch inside diameter stainless steel vessel containing 25 ml. of a catalyst consisting of 0.5 percent platinum on ⅛″ cylindrical activated alumina pellets. The calculated gas composition entering the vessel was:

| | Percent |
|---|---|
| NO | 11.5 |
| $O_2$ | 2.0 |
| $H_2O$ | 25 |
| $N_2$ | Balance |

The actual composition, owing to NO reaction with $O_2$, was approximately:

| | Percent |
|---|---|
| NO | 7.7 |
| $NO_2$ | 4.1 |
| $H_2O$ | 25.5 |
| $N_2$ | Balance |

The stream was considered to contain 2 percent $O_2$ equivalent whether $O_2$ was present as free oxygen or as nitrogen dioxide. Oxygen present as NO was not included in the $O_2$ equivalent. The gas flow was such that the space velocity was 120,000 s.c.f.h./c.f. catalyst, calculated at a temperature of 0° C. and atmospheric pressure.

With the gas inlet temperature at 194° C., addition of 4 percent hydrogen, resulted in a drop of $O_2$ equivalent to 0.6 percent, while the catalyst bed temperature rose to 437° C. With 6 percent added hydrogen, the effluent $O_2$ concentration dropped to 0.25 percent, the catalyst bed temperature rose to 671° C. The exit oxygen equivalent was measured by means of a calibrated nitrogen dioxide photometer; excess NO was added upstream of the photometer to convert any free $O_2$ to $NO_2$. Oxygen equivalent is thus equal to $O_2 + \frac{1}{2}NO_2$.

Example II

Apparatus and catalyst as described in Example I were employed, but the saturator was not used, so that the gas mixture entered the reactor dry. In addition, both upstream and downstream gas was chemically analyzed for total nitrogen oxides, ($NO+NO_2$), as well as for $O_2$ by $NO_2$-photometer. From these analyses it was possible to calculate the net NO which would be present after removal of the residual $O_2$ as $NO_2$, by scrubbing:

| | | | |
|---|---|---|---|
| a. Gas inlet temperature, °C | 195 | 142 | 140 |
| b. Percent $H_2$ added | 3.4 | 4.5 | 6.7 |
| c. $NO+NO_2$ to catalyst, percent | 11.5 | 12.2 | 11.2 |
| d. Percent $O_2$ (convertible to $NO_2$) | 1.9 | 1.9 | 1.9 |
| e. Percent NO calculated after $NO_2$ removal by scrubbing | [1] 7.7 | 8.4 | 7.4 |
| f. $NO+NO_2$ out of catalyst, percent | 9.7 | 10.1 | 8.7 |
| g. Percent $O_2$ out | 0.6 | 0.5 | 0.3 |
| h. Percent NO remaining, after catalytic $NO_2$ removal and scrubbing | [2] 8.5 | 9.1 | 8.1 |
| i. Percent improvement in NO net yield | 10 | 8 | 9 |

[1] Row c minus twice row d.   [2] Row f minus twice row g.

The combined catalytic-scrubbing operation thus yields considerably more nitric oxide than does the scrubbing step alone.

Example III

The same 0.5 percent Pt on alumina catalyst and conditions were used as in Examples I and II, but the gas flow was doubled to give a space velocity of 240,000. Yield improvements of 13 to 21 percent over conventional scrubbing were calculated:

| | | | | |
|---|---|---|---|---|
| a. Gas inlet, °C | 235 | 217 | 340 | 371 |
| b. Percent $H_2$ added | 3.4 | 4.3 | 4.3 | 4.3 |
| c. Percent ($NO+NO_2$) to catalyst | 12.4 | 11.7 | 12.8 | 12.3 |
| d. Percent $O_2$ | 1.9 | 1.9 | 1.9 | 1.9 |
| e. Percent NO calc. after $NO_2$ removal by scrubbing | 8.6 | 7.9 | 9.0 | 8.5 |
| f. Percent ($NO+NO_2$) out of catalyst | 11.3 | 10.4 | 10.6 | 10.9 |
| g. Percent $O_2$ out | 0.6 | 0.4 | 0.2 | 0.6 |
| h. Percent NO remaining, after catalytic removal and scrubbing | 10.1 | 9.6 | 10.2 | 9.7 |
| i. Percent improvement in NO yield | 17 | 21 | 13 | 14 |

Example IV

The same apparatus, conditions, and technique as used in the previous examples were used, but 100 ml. of 0.5 percent Ru on alumina were used as catalyst and the space velocity was 60,000 s.c.f.h./c.f. Good nitric oxide yields were obtained when the $H_2$ addition was near, or below stoichiometric:

| | | | |
|---|---|---|---|
| a. Gas inlet, °C | 322 | 328 | 325 |
| b. Percent $H_2$ added | 3.4 | 4.3 | 5.6 |
| c. Percent ($NO+NO_2$) to catalyst | 12.1 | 12.2 | (12.2) |
| d. Percent $O_2$ | 1.9 | 1.9 | 1.9 |
| e. Percent NO calc. after non-catalytic $NO_2$ removal | 8.3 | 8.4 | 8.4 |
| f. Percent ($NO+NO_2$) out of catalyst | 10.8 | 11.0 | 7.4 |
| g. Percent $O_2$ out | 0.3 | 0.4 | 0.25 |
| h. Percent NO, net, after catalytic process and scrubbing | 10.2 | 10.2 | 6.9 |
| i. Percent improvement in NO yield | 23 | 21 | [1] −18 |

[1] Loss.

The last value illustrates the fact that with excess $H_2$, a loss in NO is observed, by Reaction 3. Note, however, that residual $O_2$ is the lowest in the group.

Example V

Experiments were made with a 12 percent $NO$-in-$N_2$ stream at atmospheric pressure. Oxygen was added and a large volume incorporated in the system to produce $NO_2$, and then $H_2$ was added to effect selective reduction. Platinum, palladium, and ruthenium all reduced the $NO_2$ concentration, but at these conditions, platinum was most active.

| Catalyst | Space vel., s.c.f.h./c.f. | Temp., °C | Percent $NO_2$ in | Percent $H_2$ added | Percent $NO_2$ out |
|---|---|---|---|---|---|
| 0.5% Pt on activated alumina. | 30,000 | 240 | 2 | 2 | 0.8 |
| | | 295 | 2 | 3 | 0.6 |
| | | 245 | 2 | 4 | 0.5 |
| | 60,000 | 272 | 2 | 0.83 | 1.2 |
| | | 262 | 2 | 2 | 0.65 |
| | 240,000 | 230 | 2 | 2 | 0.65 |
| 0.01% Pd on activated alumina. | 250,000 | 480 | 2 | 5.5 | 0.55 |
| 0.5% Ru on activated alumina. | 100,000 | 352 | 2 | 4 | 0.45 |

Essentially the same results were obtained when the oxidizing volume ahead of the catalyst was by-passed; under this condition, $O_2$ entered the catalyst bed mostly uncombined, rather than largely as $NO_2$.

Example VI

Commercial nitric oxide was passed at the rate of 125 liters per hour (laboratory conditions) through a Pyrex glass vessel containing 2.7 grams of 0.5 percent platinum on activated alumina. At this space velocity, 40,000 s.c.f.h./c.f., $NO_2$ was removed under a variety of conditions:

| Input voltage to furnace | Percent $H_2$ | Temp., °C | Outlet $NO_2$, Percent |
|---|---|---|---|
| 35 | 0 | 208 | 0.48 |
| | 0.4 | 216 | 0.23 |
| | 0.52 | 228 | 0.10 |
| | 1.5 | 262 | 0.06 |
| | 2.2 | 272 | 0.13 |
| 45 | 0 | 272 | 0.42 |
| | 0.52 | 275 | 0.13 |
| | 1.5 | 308 | 0.09 |

As a more detailed example of selectivity, the third set of values is noted: the $NO_2$ decrease is 0.38 percent accounting for 0.38 percent $H_2$ by Reaction 1. If the balance of the hydrogen, 0.14 percent, destroys NO by Reaction 3, there is still a net gain of 0.24 percent NO.

Owing to the relatively small gas flows employed in these experiments, conditions were not adiabatic. The indicated temperatures are therefore lower than catalyst surface temperatures; this means that the process is operative at much higher true temperatures than those indicated above.

The plain activated alumina pellets of the same type as used in the manufacture of the platinum catalyst promoted very little $NO_2$ removal under similar conditions, the best result being a removal from 0.44 percent to 0.19 percent at 230° C. and 4.2 percent hydrogen.

Example VII

Supported ruthenium catalyst was evaluated under conditions similar to those of Example VI 40,000 space velocity. The catalyst was 0.3 percent Ru on activated alumina. At 216° C., no $NO_2$ removal was obtained when hydrogen was added to the stream. Modest removal was obtained at high temperatures.

| Temp., °C | Percent $H_2$ added | Percent $NO_2$ out |
|---|---|---|
| 276 | 0 | 0.27 |
| 284 | 0.7 | 0.14 |
| 292 | 4.2 | 0.07 |

Although $NO_2$ removal was poorer than with platinum catalyst, the ruthenium was more selective in the sense that little hydrogen reacted with the NO. With ruthenium, the treated gas would thus contain hydrogen and a small amount of water, and there would be little NO loss, or an actual NO gain.

Example VIII 2.7 grams of 0.5 percent rhodium on alumina pellets were evaluated as a catalyst under conditions similar to those of Example VI. Good $NO_2$ removals were measured at 40,000 and 80,000 space velocity:

| Input voltage to furnace | Space velocity, s.c.f.h./c.f. | Percent $H_2$ added | Temp., °C. | Outlet $NO_2$ |
|---|---|---|---|---|
| 45 | 40,000 | 0 | 240 | 0.26 |
|  |  | 0.7 | 286 | 0.08 |
|  |  | 1.5 | 256 | 0.04 |
|  |  | 2.2 | 295 | <0.01 |
|  |  | 4.2 | 328 | 0.03 |
| 65 | 80,000 | 0 | 200 | 0.26 |
|  |  | 0.52 | 274 | 0.15 |
|  |  | 0.75 | 300 | 0.09 |
|  |  | 1.1 | 350 | 0.01 |
|  |  | 2.2 | 370 | <0.01 |

Example IX

Three milliliters of 0.5 percent palladium on ⅛" activated alumina were used under conditions similar to Example VI. Commercial nitric oxide containing 0.24 percent $NO_2$ was passed through the catalyst bed, and various amounts of hydrogen added. The following percentage removals of $NO_2$ were observed, at a space velocity of 38,000 s.c.f.h./c.f. of catalyst:

| Input voltage to furnace | Percent $H_2$ added | Temp., °C. | Percent of $NO_2$ present removed |
|---|---|---|---|
| 28 | 0 | 142 | 0 |
|  | 2.3 | 132 | 9 |
|  | 4.4 | 134 | 17 |
| 40 | 0 | ---- | 0 |
|  | 2.2 | 184 | 46 |
|  | 3.0 | 270 | >96 |
| 52.5 | 0.7 | 290 | 79 |
|  | 1.0 | 300 | >96 |

Example X

Using the same reactor as in Examples VI to IX, little or no removal of $NO_2$ was found with three ml. of 0.1 percent Pd on silica gel when $H_2$ was added to the gas streams at temperatures up to 226° C. Removals of 13–87 percent were, however, obtained at temperatures of 446–468°, using 2 to 7.5 moles of $H_2$ per mole of $NO_2$. Plain silica gel showed a slight activity, effecting removal of 10–30 percent in the same relative composition range, and 424–426° C.

Example XI

A catalyst charge consisting of 100 ml. of 0.5 percent platinum on ⅛" activated alumina cylinders was placed in a stainless steel reactor equipped with thermocouples. A gas mixture consisting of 3 percent $O_2$ and 96.7 percent $N_2$ was passed, at the rate of 212 s.c.f.h. (NTP) through the catalyst. Nitric oxide from a commercial cylinder was introduced into the stream to give a calculated content of 0.3 percent NO. The entire mixture was passed through a preheater ahead of the catalyst; the volume of this preheater and associated piping was such that the $NO_2$ content just ahead of the catalyst was 0.17–0.2 percent, as measured on a photometer sensitive to about 0.01 percent $NO_2$. Operating pressure was 100 p.s.i.g. Hydrogen was next admitted to the stream, and the inlet gas temperature adjusted by means of the preheater until exothermic reaction occurred. This inlet temperature was maintained constant, and the downstream gas was analyzed photometrically for $NO_2$ at each hydrogen input. Considerable diminution in $NO_2$ content was observed at bed temperatures up to about 262° C.:

| Percent $H_2$ added | Inlet gas temp., °C | Cat. bed, °C. | Percent $NO_2$ in | Percent $NO_2$ out |
|---|---|---|---|---|
| 0 | 109–114 | 107–113 | 0.18 | 0.16 |
| 0.6 | 113 | 117 | 0.21 | 0.047 |
| 1.2 | 113 | 203 | 0.20 | 0.08 |
| 1.6 | 114 | 262 | 0.20 | 0.12 |
| 2.4 | 117 | 312 | 0.17 | 0.16 |

In a similar experiment, the temperature was varied from 114 to 282° C. by preheater adjustment, without added hydrogen. Essentially no $NO_2$ removal was found in this temperature range.

In another experiment, the catalyst was removed from the chamber and $NO_2$ determination made at various temperatures and hydrogen inputs. With 2.4 percent $H_2$, 147° C. inlet, there was no diminution in $NO_2$, but at about 200° C., the $NO_2$ decreased from 0.12 to 0.06 percent. As the preheat was gradually raised, the $NO_2$ downstream value improved, reaching values of 0.01–0.02 at bed temperatures of 259–500° C. With only 0.3 percent $H_2$ and 341° C. bed temperature, the $NO_2$ decreased from 0.11 percent to 0.03 percent.

Example XII

As in the previous example, 0.5 percent platinum catalyst was used, and the space velocity was maintained at 60,000 s.c.f.h./c.f. The nitric oxide flow was increased to yield 0.45 percent calculated NO, and about 0.3 percent $NO_2$ was measured photometrically. With 0.6 percent added $H_2$, $NO_2$ was diminished from 0.29 percent to 0.09 percent with 127° C. inlet and 182° C. bed temperatures. Analysis for combined NO and $NO_2$ showed only a slight decrease.

Example XIII

Oxygen content was increased to 5 percent, and conditions were the same, otherwise, as in Example XI; with 0.56 percent $H_2$, 112° C. in, 163° C. bed temperature, $NO_2$ decreased from 0.23 percent to 0.04 percent.

Example XIV

Conditions were the same as in Example XI, except that flows were decreased to give a space velocity of 20,000 s.c.f.h./c.f. Some $NO_2$ removal was found, but to a lesser extent than at high space velocity: For example, with 0.54 percent $H_2$, 120° C. in and 200° C. bed temperature, the $NO_2$ decreased only from 0.26 to 0.11 percent.

Example XV

Again, conditions and catalyst were the same as in Example XI, but flows were doubled to yield a space velocity of 120,000 s.c.f.h./c.f. Excellent $NO_2$ removals were measured

| $H_2$ added | Inlet gas temp., °C. | Percent $NO_2$ in | Percent $NO_2$ out |
|---|---|---|---|
| 0.29 | 138 | 0.19 | 0.046 |
| 0.32 | 119 | 0.19 | 0.035 |
| 0.61 | 115 | 0.19 | 0.02 |
| 1.20 | 115 | 0.18 | 0.05 |

With 0.32 percent $H_2$ in, total nitrogen oxides as determined by titration after peroxide oxidation, were found to be 0.32 percent in, 0.22 percent out. This appears to indicate that some of the $NO_2$ reduced by hydrogen is converted to compounds other than NO, such as $N_2$ or $N_2O$. Traces of the latter were identified by infra-red analysis in one experiment.

Example XVI

A group of experiments was performed in the same apparatus as described in Example XI. Again, 0.5 percent Pt catalyst was employed, but the pressure was decreased to 4 p.s.i.g. Inasmuch as the lower pressure caused a decrease in retention time, there was much less oxidation of the NO to $NO_2$ in the apparatus than occurred during the pressure experiments. In order to introduce appreciable $NO_2$, therefore, straight $NO_2$, rather than NO, was introduced in some of the experiments. Results on a 3 percent $O_2$ stream in general were not as good as in the high-pressure experiments, although good $NO_2$ removals could still be obtained by operating at higher fuel levels:

| Space velocity, s.c.f.h./c.f. | Percent NO metered | Percent $NO_2$ metered | Percent $H_2$ added | Inlet temp., °C. | $NO_2$ in | Meas. out |
|---|---|---|---|---|---|---|
| 20,000 | 0.3 | 0 | 0 | 106 | 0.01 | 0.01 |
|  | 0.9 | 0 | 0 | 109 | 0.09 | 0.09 |
|  | 0.9 | 0 | 0.6 | 99 | 0.083 | 0.068 |
| 120,000 | 0 | 0.3 | 0.3 | 159 | 0.32 | 0.22 |
|  | 0 | 0.3 | 1.6 | 214 | 0.32* | 0.04* |
|  | 0 | 0.3 | 2.4 | 214 | 0.34 | 0.06 |
| 120,000 | 0 | 0.3 | 1.6 | 181 | 0.24 | 0.04 |
|  | 0 | 0.3 | 2.4 | 180 | 0.22 | 0.02 |

In the last series of experiments, 3.6 percent water vapor was introduced into the stream by passing the gas through a saturator; $NO_2$ removal was not measurably affected. At conditions corresponding to the values marked with an asterisk, 0.269 percent total nitrogen oxides was found upstream by chemical analysis, and 0.237 downstream. This shows that $NO_2$ was removed principally by conversion to NO.

Example XVII

Three catalysts were compared under the following conditions: Space velocity, 120,000 s.c.f.h./c.f., pressure, 100 p.s.i.g., $O_2$: 3.0 percent; NO metered: 0.3 percent, $N_2$: 94–97 percent. The results are tabulated:

| Catalyst | Percent $H_2$ added | Temp., °C. Inlet | Temp., °C. Bed | Nitrogen dioxide, percent In | Nitrogen dioxide, percent Out |
|---|---|---|---|---|---|
| 0.5% Pd on activated alumina | 0.35 | 126 | 127 | 0.16 | 0.09 |
|  | 0.35 | 152 | 164 | 0.16 | 0.07 |
|  | 0.35 | 170 | 193 | 0.14 | 0.05 |
|  | 0.6 | 174 | 221 | 0.13 | 0.04 |
|  | 1.3 | 181 | 282 | 0.12 | ¹0.02 |
|  | 2.4 | 185 | 383 | 0.11 | <0.01 |
| 0.5% Ru on activated alumina | 0.15 | 250 | 261 | 0.14 | 0.02 |
|  | 0.3 | 245 | 257 | 0.13 | 0.02 |
|  | 0.6 | 252 | 273 | 0.13 | 0.01 |
|  | 1.2 | 250 | 282 | 0.13 | 0.03 |
| 0.1% Pt on activated alumina | 0.15 | 172 | 170 | 0.14 | 0.84 |
|  | 0.6 | 180 | 231 | 0.14 | 0.02 |
|  | 0.1 | 175 | 194 | 0.13 | 0.02 |

¹ Total nitrogen oxides decreased from 0.315 percent to 0.277 percent.

It will be seen that ruthenium is extremely selective; the temperature rise is much smaller than would be produced by reaction of all the hydrogen present in the stream. This means that the catalyst is promoting the $H_2$—$NO_2$ reaction and curtailing the $H_2$—$O_2$ reaction to a very high degree.

These data also show several cases in which the $NO_2$ is removed with a concentration of hydrogen very near the stoichiometric requirement. By way of comparison, the hydrogen use is only about one-sixtieth of the amount which would be used for nonselective removal of $NO_2$.

Example XVIII

A series of experiments was performed by metering nitric oxide, methane and air from compressed gas tanks, mixing the gases together by flow through a tube and then passing the mixed gases through a heater and a catalyst bed. The operating conditions, together with the results obtained are tabulated below:

100 p.s.i.g.
Catalyst—0.3 percent Rh on 5/32" alumina pellets, 100 ml. in 1.76" I.D. bed
NO in—0.3 percent Space velocity—60,000 hr.⁻¹ $\Delta P = 1"$ $H_2O$
[No ignition at 640°; ignited with catalyst at 707°]

| Expt. No. | Temp. °F. 2 Inlet | Temp. °F. 3 Outlet | Percent $O_2$ in | Percent $CH_4$ in | $O_2/CH_4$ | Percent NO out |
|---|---|---|---|---|---|---|
| 1 | 721 | 1,235 | 2.95 | 1.65 | 1.79 | 0.0007 |
| 2 | 715 | 1,203 | 2.96 | 1.43 | 2.08 | 0.22 |

Space velocity—120,000 hr.⁻¹ $\Delta P = 2.8"$ $H_2O$
[No ignition at 660°; app. 750° cat. temp. required to start]

| 3 | 732 | 1,325 | 3.07 | 1.53 | 2.01 | 0.076 |
| 4 | 738 | 1,238 | 2.92 | 1.39 | 2.1 | 0.31 |

Complete reaction of one mole of methane requires two moles of oxygen. This example shows that, where some excess of oxygen is present (more than $2O_2/CH_4$ mole ratio, especially more than $2.08 O_2/CH_4$ mole ratio), the reaction of the methane is with the oxygen in preference to reaction with nitrogen oxides.

Example XIX

A series of runs was made to show the selective removal of oxygen from a gas stream containing nitric oxide, without appreciable loss of yield of nitric oxide, by reacting the oxygen with a reducing agent such as methane, over a catalyst at suitable operating conditions. Using the preferred operating conditions and a gas initially containing nitric oxide and oxygen in approximately a 10:1 ratio, the removal of 95–98 percent of the oxygen was effected, while only 2 to 3 percent of nitric oxide was removed.

The reactor was a 6-inch section of 1-inch stainless steel tubing (I.D. 0.87"), packed with catalyst, and submerged in a molten, agitated "Hitec" salt bath to permit good temperature control. The nitric oxide and air streams were preheated separately to essentially the temperature of the run to avoid nitrogen dioxide formation in the feed stream. Methane was added to the feed gas just prior to catalyst contact, in order to minimize the possibility of precombustion.

The feed and product streams were analyzed for nitric oxide by a Perkin-Elmer in-stream vapor fractometer and, for nitrogen dioxide, by an in-stream Model IV Photoelectric-Analyzer. With these data, it was possible to calculate the consumption of oxygen and nitric oxide.

The reducing agent or fuel employed in these runs was technical-grade methane having the following composition:

|  | Percent |
|---|---|
| Methane | 93 |
| Ethane | 3 |
| Propane | 1 |
| Higher hydrocarbons, $N_2$, and $CO_2$ | 3 |

Most runs were carried out with a gas mixture containing, by volume, approximately 10 percent nitric oxide, 1 percent oxygen, and 0.5 percent methane (the 1:2 ratio of methane to oxygen is the stoichiometric ratio to yield carbon dioxide and water). The balance of the gas was nitrogen in most cases; however, in some runs, steam replaced a portion of the nitrogen with no significant difference in results. In some runs, a higher ratio of methane to oxygen was used (about 1:1) and, when this was done, the oxygen concentration was reduced to about 200 p.p.m., and the nitric oxide consumption was only slightly higher.

Rhodium catalyst gave the best selectivity of the catalysts tested, while platinum was the most active and the least selective, i.e. in the presence of platinum approximately one-half of the methane reacted with nitric oxide. Palladium was intermediate in activity and selectivity (between the platinum and rhodium). The catalyst supports were ⅛" alumina pellets or alumina spheres.

In these runs, suitable temperatures for the reaction were found to be in the range of 350° to 600° C., with an exit temperature of 550° to 600° C. being preferred. Below 350° C., little or no reaction occurred, and above 600° C., the reaction became progressively less selective. In the absence of a catalyst, no reaction occurred at a temperature of 550° C.

Most of the experimental runs were made arbitrarily at a pressure of 40 p.s.i.g., but the effect of pressure on the selectivity did not appear to be significant; comparable results were obtained at 40, 30 and 20 p.s.i.g.

Space velocities of 15,000 to 50,000 hr.$^{-1}$ were employed, with about 45,000 hr.$^{-1}$ being preferred.

In the actual operating procedure, the reactor was filled with a catalyst consisting of 0.5 percent rhodium on ⅛" alumina pellets and inserted in a salt bath, with the temperature being adjusted to 500° C. The various gas flows were then started in the sequence of nitrogen, nitric oxide, oxygen and methane and adjusted to give a feed composition, by volume, of 9.81 percent nitric oxide, 1 percent oxygen, 0.5 percent methane, and the balance nitrogen. A pressure on the reactor of 40 p.s.i.g. was maintained by throttling the flow control valve downstream from the reactor. After about 15 minutes of operation, the reactor exit temperature steadied out at 546° C., and the product gas analyzed 9.57 percent nitric oxide and 0.05 percent oxygen. Analysis was effected by allowing the gas to cool to room temperature and, under these conditions, the oxygen reacted with nitric oxide to form nitrogen dioxide which was then measured by a vapor fractometer. From the product analysis, it was calculated that 95 percent of the uncombined oxygen had been consumed by reaction to form carbon dioxide, carbon monoxide and water, while only 2.45 percent of nitric oxide had been consumed. These data appear as run 10 in the table below.

The foregoing procedure was repeated, using the different conditions and obtaining the results given, in runs 12, 13 and 14 in the table below.

The foregoing procedure was repeated, except that a palladium catalyst was used, and the conditions and results are given in runs 2, 4 and 8 in the table below.

A run similar to No. 11 in the table below was made, with the exception that a platinum catalyst was used, and the selectivity of the platinum catalyst was found to be inferior in that only 27 percent of the oxygen was removed.

The results are tabulated in the table below:

CATALYST—0.5% PALLADIUM ON ⅛-INCH SPHERES CONTAINING 94% Al$_2$O$_3$ AND 6% SiO$_2$

| Run No. | Operating conditions | | | | Feed gas analysis, vol. percent | | | Product gas analysis, vol. percent | | Feed gas consumption, vol. percent | |
|---|---|---|---|---|---|---|---|---|---|---|---|
| | Salt temp., °C. | Reactor exit temp., °C. | Superficial retention time, sec. | Space velocity hr.$^{-1}$ | NO | O$_2$ | CH$_4$ | NO | O$_2$ | NO | O$_2$ |
| 1 | 450 | 472 | 0.1 | 50,671 | 10.58 | 1.0 | 0.5 | 10.11 | 0.45 | 3.98 | 55.0 |
| 2 | 450 | 471 | 0.2 | 25,336 | 10.18 | 1.0 | 0.5 | 10.05 | 0.35 | 1.28 | 65.0 |
| 3 | 500 | 552 | 0.1 | 47,393 | 10.18 | 1.0 | 0.5 | 9.24 | 0.16 | 9.23 | 84.0 |
| 4 | 500 | 524 | 0.2 | 23,697 | 10.90 | 1.0 | 0.5 | 10.35 | 0.20 | 5.04 | 80.0 |
| 5 | 500 | 507 | 0.3 | 15,798 | 10.66 | 1.0 | 0.5 | 9.93 | 0.35 | 6.85 | 65.0 |
| 6 | 550 | 574 | 0.1 | 44,514 | 9.05 | 1.0 | 0.5 | 8.13 | 0.15 | 10.17 | 85.0 |
| 7 | 550 | 558 | 0.2 | 22,257 | 10.80 | 1.0 | 0.5 | 9.41 | 0.10 | 12.87 | 90.0 |
| 8 | 570 | 593 | 0.1 | 47,393 | 10.52 | 1.0 | 0.5 | 9.56 | 0.75 | 9.12 | 92.5 |

CATALSYT—0.5% RHODIUM ON ⅛-INCH ALUMINA PELLETS

| Run No. | Salt temp., °C. | Reactor exit temp., °C. | Superficial retention time, sec. | Space velocity hr.$^{-1}$ | NO | O$_2$ | CH$_4$ | NO | O$_2$ | NO | O$_2$ |
|---|---|---|---|---|---|---|---|---|---|---|---|
| 9 | 450 | 482 | 0.2 | 25,336 | 99.90 | 1.0 | 0.5 | 9.44 | 0.21 | 4.65 | 79.0 |
| 10 | 500 | 546 | 0.1 | 47,393 | 9.81 | 1.0 | 0.5 | 9.57 | 0.05 | 2.45 | 95.0 |
| 11 | 500 | 521 | 0.2 | 23,697 | 9.81 | 1.0 | 0.5 | 9.35 | 0.10 | 4.60 | 90.0 |
| 12 | 550 | 580 | 0.1 | 44,514 | 8.67 | 1.0 | 0.5 | 8.23 | 0.00 | 5.07 | 100.0 |
| 13 | 500 | 524 | 0.1 | 47,393 | 9.92 | 1.0 | 0.5 | 9.71 | 0.10 | 2.12 | 90.0 |
| 14 | 550 | 585 | 0.1 | 44,514 | 8.82 | 1.0 | 0.5 | 8.55 | 0.015 | 3.06 | 98.5 |

Note.—All runs were made at 40 p.s.i.g.

*Example XX*

A mixture of air, ammonia, and steam was preheated to 304° C. and passed over a platinum gauze at 940° C., and a pressure of 54 p.s.i.g., to generate a gas containing nitric oxide and unreacted oxygen. The initial mixture contained 30 mole percent of steam and had a weight ratio of oxygen to ammonia of 2.99. The product gas was cooled to room temperature and, after separation of the condensate, the gas analyzed, by volume, 6.20 percent nitric oxide and 5.25 percent nitrogen dioxide.

A portion of the gas stream from the platinum gauze was cooled to about 400° C., mixed with a stream of methane, and passed through an insulated stainless steel reactor 1 inch in diameter by 8 inches long. The reactor was packed with rhodium catalyst similar to that used in the procedure given above in the foregoing example. The inlet temperature was 354° C., and the outlet temperature was 582° C.; the pressure was 45 p.s.i.g. Methane, at a rate of 0.0231 lb./hr. was mixed with 3.71 lb./hr. of gas from the platinum gauze. The product gas was cooled to room temperature and, after separation of the condensate, the gas analyzed, by volume, 11.4 percent nitric oxide, 0.92 percent nitrogen dioxide, 2.2 percent carbon dioxide, and negligible methane.

This example illustrates the significant improvement in yield of nitric oxide that can be obtained by selective removal of the oxygen.

This application is a continuation-in-part of application Serial No. 803,065, filed March 31, 1959, and now abandoned.

It will be obvious to those skilled in the art that many modifications may be made within the scope of the present invention without departing from the spirit thereof, and the invention includes all such modifications.

What is claimed is:

1. A process for effecting the selective removal of oxygen from a gaseous mixture consisting essentially of oxygen and nitric oxide which comprises contacting an admixture of a normally gaseous hydrocarbon and said gaseous mixture with a catalyst selected from the group consisting of palladium and rhodium at a temperature in the range of about 350° to 600° C., said normally gaseous hydrocarbon being present in an amount at least stoichiometrically equivalent to the oxygen present in said gaseous mixture.

2. The process of claim 1 in which the normally gaseous hydrocarbon is methane.

3. The process of claim 1 in which the catalyst consists of rhodium on an inert support.

4. The process of claim 1 in which the catalyst consists of paladium on an inert support.

5. A process for effecting the selective removal of oxygen from a gaseous mixture consisting essentially of oxygen and nitric oxide which process comprises contacting an admixture of a normally gaseous hydrocarbon and said gaseous mixture with a supported rhodium catalyst at a space velocity in the range of about 15,000 to 50,000 s.c.f.h./c.f., at temperature in the range of about 350° to 600° C., and a pressure between atmospheric and 100 p.s.i.g., said normally gaseous hydrocarbon being present in a quantity at least stoichiometrically equivalent to the oxygen present in said gaseous mixture.

6. The process of claim 5 in which the normally gaseous hydrocarbon is methane.

References Cited in the file of this patent

UNITED STATES PATENTS

| | | |
|---|---|---|
| 1,487,647 | Fauser | Mar. 18, 1924 |
| 2,245,550 | Andrussow | June 10, 1941 |
| 2,382,189 | Wahl | Aug. 14, 1945 |
| 2,673,141 | Barman | Mar. 23, 1954 |
| 2,884,308 | Fierce | Apr. 28, 1959 |
| 2,910,343 | Childers | Oct. 27, 1959 |